May 23, 1967

H. T. STERLING

3,321,608

DIGITAL PROGRAMMER FOR CONTROLLING VARIABLE CONDITION

Filed April 15, 1963

INVENTOR.
Howard T. Sterling,
BY
Wolfe, Hubbard, Voit & Osann
Attorneys.

May 23, 1967

H. T. STERLING 3,321,608

DIGITAL PROGRAMMER FOR CONTROLLING VARIABLE CONDITION

Filed April 15, 1963

INVENTOR.
Howard T. Sterling,
BY
Wolfe, Hubbard, Voit & Osann
Attorneys.

May 23, 1967     H. T. STERLING     3,321,608
DIGITAL PROGRAMMER FOR CONTROLLING VARIABLE CONDITION
Filed April 15, 1963     5 Sheets-Sheet 5

INVENTOR.
Howard T. Sterling,
BY Wolfe, Hubbard, Voit & Osann
Attorneys.

United States Patent Office 3,321,608
Patented May 23, 1967

3,321,608
DIGITAL PROGRAMMER FOR CONTROLLING VARIABLE CONDITION
Howard T. Sterling, Downers Grove, Ill., assignor to Packard Instrument Company, Inc., Lyons, Ill., a corporation of Illinois
Filed Apr. 15, 1963, Ser. No. 273,235
10 Claims. (Cl. 235—151.1)

The present invention relates to a digital programmer for precisely controlling the variations of a changeable condition. More particularly, the invention is concerned with selectively establishing the initial value, the final value and the manner of variation between such values, of a controlled condition. While not so limited in its uses, the invention finds particularly advantageous application in accurately controlling the change of temperature or the like from an initial operating level to a final operating level.

A primary object of this invention is to provide a device for accurately controlling the change of a condition at a desired rate from an initial operating level to a final operating level. In this connection an object of this invention is to provide a digital ramp programmer wherein the rate of change may be accurately varied over a wide range so that the rate may be preset at a desired rate. Another object of this invention is to provide a digital ramp programmer wherein the initial and final operating levels may be readily and accurately varied over a wide range.

Another object of the present invention is to provide a digital ramp programmer which is particularly well-suited to a batch process and which does not require manual supervision during start-up nor the making of any adjustments, based upon prior experience, to accommodate the controller to the particular function being performed. A more specific object of the invention is to provide a digital ramp programmer which may be adapted to control processes having widely different time constants and which is not restricted to controlling processes having time constants within a particular range.

A more specific object of the present invention is to provide a digital ramp programmer for accurately controlling the change in temperature from an initial operating level to a final operating level wherein the temperature may be returned to the initial operating level or to ambient condition upon the final operating level being attained.

A general object of the present invention is to provide a digital ramp programmer which is more reliable and flexible than present systems and in which the various control functions may be accomplished electronically so that a high degree of compactness, in addition to reliability and flexibility, may be attained.

Other objects and advantages of the invention will become apparent as the following description proceeds, taken in conjunction with the drawings, in which.

While the invention has been described in connection with a preferred exemplary embodiment, it is to be understood that it is not to be limited to the disclosed embodiment but, on the contrary, is intended to cover the various modifications and equivalent arrangements included within the spirit and scope of the appended claims.

In some of the drawings, transistors have been schematically illustrated having bases, emitters and collectors respectively designated as $b$, $e$ and $c$. As is common in the art, transistors of the NPN type have been illustrated with emitter arrow pointing away from the base electrode and these transistors are rendered conductive when the base is driven positive with respect to the emitter, whereas transistors of the PNP type have been illustrated with the emitter arrow pointing toward the base electrode and these transistors are rendered conductive when the base is driven negative with respect to the emitter.

Additionally, flip-flops have been symbolically illustrated. A brief description of the operation of the symbolically illustrated flip-flops may be helpful in understanding the operation of the digital ramp programmer. The flip-flops are illustrated as rectangles having two sections, one being marked "S" and the other being marked "R." Inputs to the flip-flops are connected to the left-hand sides thereof, as illustrated, and outputs are connected from the right-hand sides thereof. When an input signal or pulse is applied to the "S" section of a flip-flop and the flip-flop is in the reset condition, it is set and a desired output signal is provided at the "S" output terminal only. Conversely, when an input signal or pulse is applied to the "R" section of a flip-flop and the flip-flop is in the set condition, it is reset and a desired output signal is provided at the "R" output terminal only. Finally, when an input signal or pulse is applied to an input connected to the junction of the "S" and "R" sections of a flip-flop, the flip-flop is switched from one state to the other.

Further, throughout the specification, the terms "negative signal" and "ground signal" are utilized. These terms are respectively intended to cover a negative-going signal having a negative resting level, i.e., switched from ground to negative, and a positive-going signal having a ground resting level, i.e., switched from negative to ground.

FLIP-FLOP CIRCUIT

Figure 1:
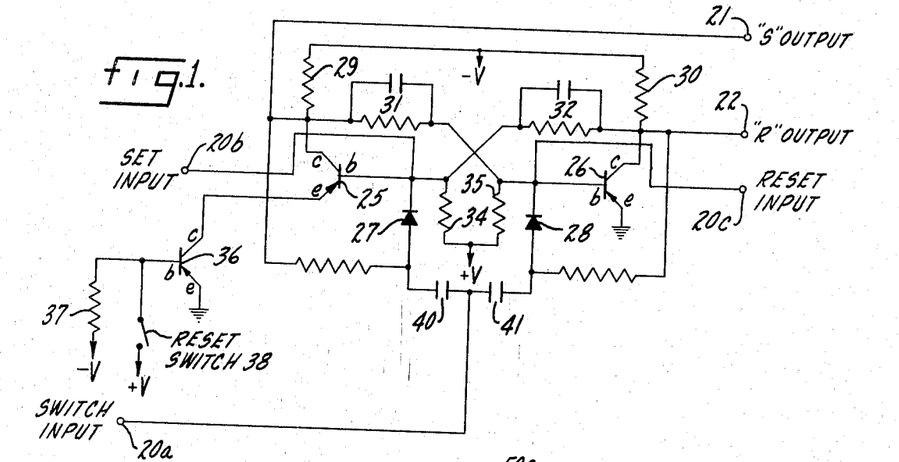
FIGURE 1 is a schematic diagram of a typical bistable device or flip-flop circuit utilized in the present invention.

For the purpose of aiding in more readily understanding the operation of the present invention, the details of a typical flip-flop circuit are illustrated in FIG. 1 and the operation thereof will be briefly set forth. Referring to FIG. 1, the flip-flop includes a "switch" input terminal 20a, a "set" input terminal 20b, a "reset" input terminal 20c, an "S" output terminal 21, and an "R" output terminal 22, the "R" output terminal 22 may be connected to the input terminal of the next succeeding flip-flop stage. A pair of PNP type transistors 25 and 26 are provided for responding to input pulses or signals applied to the input terminal 20a for controlling the potential at the output terminals 21 and 22, the base of both transistors 25 and 26 being connected to the input terminal 20a through diodes 27 and 28 and the collectors thereof being respectively connected to the "S" output terminal 21 and to the "R" output terminal 22. Additionally, the collectors of transistors 25 and 26 are respectively connected to a negative voltage source, designated as "−V," through load resistors 29 and 30 and are respectively connected to the base of the other transistor through resistor-capacitor parallel arrangements 31 and 32, whereas the bases of the transistors are respectively connected to a positive potential, designated as "+V," through resistors 34 and 35. The emitter of transistor 25 is connected to ground through the emitter-collector circuit of a normally conductive PNP type transistor 36 and the emitter of transistor 26 is connected directly to ground.

The diodes 27 and 28 are provided so that the flip-flop only responds to input pulses of a desired polarity, the illustrated flip-flop responding to ground or positive input pulses only. In essence, the diodes also direct input pulses to the base of one of the transistors 25 and 26.

From the foregoing, it will be apparent that, when the base of one of the transistors 25 and 26 is driven negative with respect to the emitter, that transistor is rendered conductive. In response to the transistor being rendered conductive, the collector thereof is raised to approximately ground potential, causing the base of the opposite transistor to be instantaneously clamped to ground so that the opposite transistor is rendered nonconductive, since its emitter is connected to ground, and the potential at the collector thereof drops toward the negative potential −V. This results in a regenerative action since the negative-going potential provided at the collector of the then nonconducting transistor is applied to the base of the then conducting transistor causing the conducting transistor to be rapidly and positively rendered fully conductive.

Under steady-state conditions, at the beginning of an operation, the flip-flop is to be in the reset condition, i.e., transistor 26 is to be conductive so that a ground signal is provided at the "R" output terminal 22. Transistor 25 is to be nonconductive so that a negative output signal is provided at the "S" output terminal 21. For this purpose, the transistor 36 is connected between the emitter of transistor 25 and ground. Transistor 36 is normally conducting since it is of the PNP type and its base is normally connected to a minus potential, also designated as "−V," through a resistor 37. Prior to the beginning of an operation, the flip-flop is reset by closing a reset switch 38 which clamps the base of transistor 36 to a positive potential, also designated as "+V," so that transistor 36 is rendered nonconductive and, accordingly, transistor 25 is rendered nonconductive, if it was not already in the nonconductive condition, since the emitter-collector circuit thereof is open-circuited. Upon transistor 25 being rendered nonconductive, the potential at the collector thereof drops toward the negative potential −V so that the base of transistor 26 is driven negative with respect to the emitter and the transistor is rendered conductive. Through the regenerative action of the flip-flop circuit, transistor 26 is rapidly and positively rendered fully conductive and transistor 25 is rapidly and positively rendered nonconductive.

Subsequently, when a positive or ground pulse is applied to the input terminal 20a, the diode 28 directs the pulse to the base of transistor 26 which is driven positive with respect to the emitter or is driven to substantially the same potential as the emitter so that transistor 26 is rendered nonconductive. Again, the regenerative action of the flip-flop takes place so that transistor 25 is rendered fully conductive and transistor 26 is rendered fully nonconductive. Under these circumstances, the collector of transistor 25 is clamped to ground and the collector of transistor 26 is driven toward the negative potential −V so that a ground output signal is provided at the "S" output terminal 21 and a negative output signal is provided at the "R" output terminal 22. When a subsequent positive or ground input pulse is applied to the input terminal 20a, the diode 27 directs the pulse to the base of transistor 25 and the action of the flip-flop reverses so that transistor 25 is rendered fully nonconductive, whereas transistor 26 is rendered fully conductive. Under these circumstances, the collector of transistor 26 is clamped to ground and the collector of transistor 25 drops toward the negative potential −V so that a negative output signal is provided at the "S" output terminal 21 and a ground output signal is provided at the "R" output terminal 22. As previously mentioned, the output terminal 22 is connected to the input terminal of the next succeeding flip-flop stage and the next succeeding flip-flop stage will respond to the ground signal provided at the output terminal 23 in like manner as described above for the illustrated flip-flop.

For the purpose of insuring that the flip-flop stages only respond to a change in condition at the input and are not continuously affected by a steady-state condition thereat, capacitors 40 and 41 are respectively connected between the base of transistors 25 and 26 and the input terminal 20a. The capacitors differentiate positive-going changes at the input to provide a positive pulse or "spike" and differentiate negative-going changes to provide a negative pulse or "spike."

Though the flip-flop stage is illustrated for responding to ground or positive potential input pulses and for providing ground or negative potential output pulses, it is to be understood that the digital ramp programmer may readily be adapted to use any desired flip-flops which respond to input pulses of a desired polarity and provide desired output pulses.

DIGITAL RAMP PROGRAMMER

In accordance with the present invention, a digital ramp programmer is provided for controlling the change of a condition from an initial operating level to a final operating level at a desired rate. More specifically, a digital ramp programmer is provided for accurately controlling the change of a condition at a desired rate from an initial operating level to a final operating level, characterized in that the rate of change may be adjusted to meet desired control conditions and characterized in that the condition may be returned to the initial operating level or to another desired condition subsequent to operating at the final operating level for a desired period of time.

In describing the present invention, the operation thereof will be set forth in conjunction with controlling the temperature level in a furnace or the like. However, this is merely an illustration of only one environment in which the invention may find advantageous use, whereas it may be utilized in any operation wherein a condition is to be varied from an initial operating level to a final operating level. Accordingly, the invention is intended to cover the controlling of any desired condition.

Figure 2:
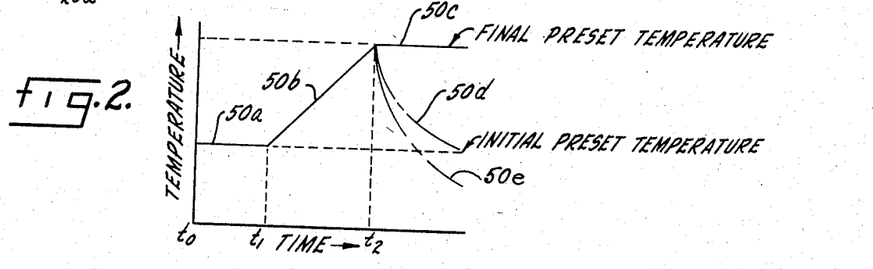
FIG. 2 is a graph illustrating a typical operating cycle for the present invention.

A graph illustrating a typical operating cycle for the digital ramp programmer controlling temperature in a furnace is illustrated in FIG. 2 wherein temperature is plotted against time. Prior to the beginning of a desired controlling operation, the temperature in the furnace is brought up to the initial preset temperature level indicated by the solid line 50a extending between times designated as $t_0$ and $t_1$. At times $t_1$, the desired controlling operation is initiated and the temperature in the furnace is controllably changed from the initial preset temperature to the final preset temperature at a desired rate indicated by the solid line 50b extending between the times designated as $t_1$ and $t_2$. Subsequent to the temperature in the furnace attaining the final preset temperature level, the temperature may be maintained at that temperature level, indicated by the solid line 50c, or the temperature may then be reduced to a lower or ambient condition, the temperature being returned to the initial preset temperature level in the illustrated graph as indicated by the broken line 50d or to ambient as indicated by the broken line 50e.

Figure 3:
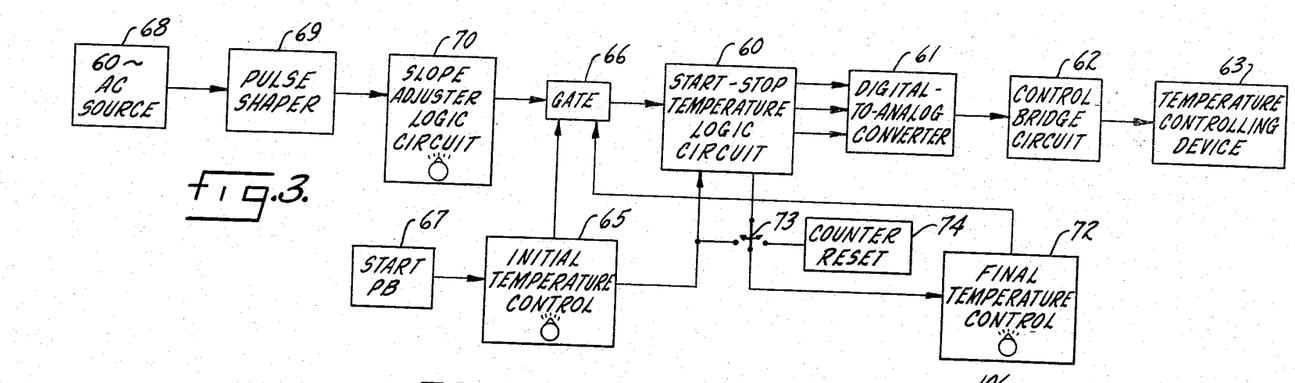
FIG. 3 is a block diagram of a digital ramp programmer constructed in accordance with the present invention.

Referring to FIG. 3, the digital ramp programmer is illustrated in simplified block form. A start-stop temperature logic circuit 60, which includes a counter, is provided for producing a digital output representative of the desired temperature level to be attained in the furnace, the count in the counter corresponding to the desired temperature level and being altered in response to the application of input pulses to the start-stop temperature logic circuit. It follows, then, that the rate at which the digital output increases in value is dependent upon the rate at which input pulses are applied to the start-stop temperature logic circuit. A digital-to-analog converter 61 is associated with the output of the start-stop temperature logic circuit 60 and converts the digital output provided thereby into an analog signal having an amplitude representative of the digital output. The analog signal is in turn transmitted to a control bridge circuit which responds thereto to control the operation of a temperature controlling device 63 in accordance with the amplitude of the analog signal, the temperature controlling device 63 controlling the temperature level in the furnace. Since the temperature controlling device 63 may take any specific form familiar to those in the art, the details thereof will not be set forth. Suffice it to say that the temperature controlling device 63 may be designed to control, for example, the application of power to a heater winding associated with the furnace or to control the flow of steam or hot water to a related heating device associated with the furnace in accordance with the amplitude of the analog signal, the actual "heat sink" controlled varying with the type of furnace operation being controlled. Accordingly, it may be seen that the furnace temperature is controlled in accordance with the digital output of the start-stop temperature logic circuit 60, which in turn is dependent upon the rate at which input pulses are applied thereto.

In accordance with an aspect of the present invention, means are provided for establishing the initial digital output of the logic circuit 60 which establishes the initial level of the analog signal and, thus, establishes the initial or starting temperature level. This is accomplished digitally by adjustable means for presetting the count in the counter of the logic circuit. In the present instance, an initial temperature control 65 is provided for presetting the count in the counter, the control 65 having an adjusting knob thereon for presetting the count to correspond to the desired initial digital output of the logic circuit 60. The control 65 also controls the opening of a gate 66 which, when open, allows input pulses to be transmitted to the start-stop temperature logic circuit, the control 65 operating to open the gate 66 in response to the depressing of a start push button 67 associated therewith.

In accordance with another aspect of the present invention, means are provided for producing a series of pulses having a frequency corresponding to the desired rate at which the controlled condition is to be varied from the initial operating level to the final operating level. Preferably, the frequency at which pulses are produced is variable so that the rate of change may be varied. Such a source of pulses is illustrated in the present instance as a slope adjuster logic circuit 70 which supplies input pulses to the gate 66, characterized in that an adjustable knob is provided thereon for varying the rate at which input pulses are supplied. The logic circuit 70 is energized by a source of constant frequency input pulses which includes a 60 cycle A.-C. source 68 and a pulse shaper 69, the pulse shaper being of standard design and providing pulses of a desired volt-second content for each A.-C. cycle. Thus, it may be seen that under operating conditions when the gate 66 is open, the slope adjuster logic circuit 70 controls the rate at which the digital output and the analog signal vary and, accordingly, controls the rate at which the temperature in the furnace is varied, i.e., controls the "ramp" function.

In accordance with still another aspect of the present invention, means are provided for establishing the maximum or final digital output of the logic circuit 60 which establishes the final level of the analog signal and, thus, establishes the maximum or final temperature level. This is accomplished digitally by adjustable means preset to respond to a desired digital output for closing the gate 66. In the present instance, a final temperature control 72 is provided having an adjustable knob thereon which may be set so that the control 72 responds to the desired final digital output of the logic circuit 60 to close the gate. Subsequently, pulses are no longer transmitted to the logic circuit 60 and it follows that the temperature in the furnace will remain at the final preset temperature level unless the count in the counter is changed.

For varying the temperature level subsequent to the final preset temperature level being attained, a control switch 73 is provided for disassociating the start-stop temperature logic circuit 60 from the final temperature control 72 and associating it with the initial temperature control 65 or with a counter reset unit 74. If the logic circuit 60 is again associated with the control 65, the count in the counter is switched back to a value corresponding to the initial temperature level and the temperature in the furnace is returned to the initial preset temperature level, as described above with reference to curve 50d in FIG. 2. If the logic circuit 60 is associated with the reset unit 74, the counter is reset to zero value so that a zero digital output is provided and the temperature in the furnace is returned to a desired ambient condition.

In general, the operation of the digital ramp programmer illustrated in FIG. 3 is as follows. Initially, a value corresponding to the initial preset temperature level is registered in the initial temperature control 65 and a value corresponding to the final preset temperature level is registered in the final temperature control 72. The counter in the start-stop temperature logic circuit 60 is thus preset to a count corresponding to the initial preset temperature level in response to the registering of the value in the control 65. Additionally, the slope adjuster logic circuit 70 is preset to provide pulses at a rate which corresponds to the desired rate at which the temperature in the furnace is to be changed from the initial preset temperature level to the final preset temperature level. It follows, then, that the temperature in the furnace will attain the initial preset temperature level depicted by the solid line 50a in FIG. 2. If at time $t_1$ the start push button 67 is depressed, the gate 66 is opened and pulses are transmitted from the logic circuit 70 to the logic circuit 60 causing the count in the counter therein to increase at a desired rate. Accordingly, the digital output will increase and the amplitude of the analog signal provided by the digital-to-analog converter 61 will also increase. The temperature in the furnace is correspondingly increased since the temperature controlling device 63 regulates the temperature in the furnace in accordance with the amplitude of the analog signal. When the count in the counter attains a value corresponding to the desired final preset temperature level, the control 72 is rendered operative to close the gate 66 so that the further transmission of pulses therethrough to the logic circuit 60 is prohibited. The temperature in the furnace will then remain at the final temperature level. If the switch 73 is subsequently set so that the logic circuit 60 is again associated with the control 65 and the counter is returned to a value corresponding to the initial preset temperature level, the temperature in the furnace will correspondingly be returned to this temperature level.

From the foregoing, it may be seen that the digital ramp programmer accurately controls the change of temperature in a furnace from an initial operating level to a final operating level at a desired rate, the initial temperature level being dependent upon the presetting of the initial temperature control 65, the final temperature level being dependent upon the presetting of the final temperature control 72, and the rate at which the temperature in the furnace is changed being dependent upon the presetting of the slope adjuster logic circuit 70. To provide a better understanding of the operation of the digital ramp programmer, a more detailed description of some of the components in FIG. 3 may be helpful.

Slope adjuster logic circuit 70

Figure 4:
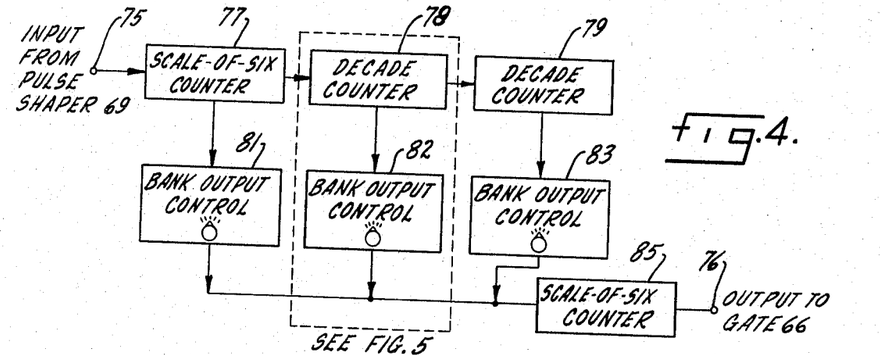
FIG. 4 is a more detailed block diagram of a slope adjuster logic circuit utilized in the digital ramp programmer illustrated in FIG. 3.

Referring to FIG. 4, a slope adjuster logic circuit 70, which controls the rate at which input pulses are applied to the start-stop temperature logic circuit 60, is illustrated in more detailed block form. In the illustrated embodiment, the logic circuit has an input terminal 75 and an output terminal 76 and includes a scale-of-six counter 77 and a pair of decade counters 78 and 79 which are cascaded or connected in tandem. Since, as previously mentioned, one pulse is applied to the logic circuit for each output cycle of a 60 cycle A.-C. source 68, it will be readily understood that sixty pulses are applied thereto every second or thirty-six hundred pulses are applied thereto every minute. The scale-of-six counter 77 is designed to be filled and to provide an output for every six input pulses applied thereto and the decade counters 78 and 79 are designed to be filled and to provide an output for every ten input pulses applied thereto. Accordingly, it may be seen that, in the illustrated arrangement, an output pulse will be provided by the scale-of-six counter 77 for every six input pulses applied to the input terminal 75, an output pulse will be provided by the decade counter 78 for every sixty input pulses applied to the input terminal 75 and an output pulse will be provided by the decade counter 79 in response to every six hundred input pulses applied to the input terminal 75. Thus, with the 60 cycle A.-C. source 68, the scale-of-six counter 77 provides six hundred output pulses per minute, the decade counter 78 provides sixty output pulses per minute, and the decade conter 79 is filled once every ten seconds or six times per minute.

For the purpose of controlling the flow of pulses to the output terminal 76 from the counters 77–79 and thus for the purpose of controlling the frequency of pulses to the logic circuit 60, three bank output controls 81–83 and a scale-of-six counter 85 are provided. Each bank output control is associated with one of the counters 77–79 and the scale-of-six counter 85 is interposed between the output terminal 76 and the outputs of the bank output controls 81–83. The bank output controls 81–83 control the transmission of pulses from the counters 77–79 to the scale-of-six counter 85, each bank output control being so designed and so associated with one of the counters 77–79 that it may be preset to control the transmission of a pulse from the associated counter to the scale-of-six counter 85 at desired intermediate counts between zero count and the maximum count of the associated counter. For example, the bank output control 81 associated with the scale-of-six counter 77 may be preset to allow a desired number of pulses from zero to five to be transmitted to the scale-of-six counter 85 for every six input pulses applied to the scale-of-six counter 77. Likewise, the bank output controls 82 and 83, respectively associated with the decade counters 78 and 79, may be preset to allow a desired number of pulses between zero and nine to be transmitted to the scale-of-six counter 85 for every ten input pulses applied to the associated decade counter.

Accordingly, with the 60 cycle A.-C. source 68, the bank output control 81 may be preset to allow 0, 600, 1200, 1800, 2400 or 3000 pulses per minute to be transmitted to the scale-of-six counter 85 from the scale-of-six counter 77. In actual practice, only the 0, 600, 1200 or 1800 pulses per second output frequencies have been found to be required for the desired controlling operation. Since six hundred pulses per minute are applied to the decade counter 78, the bank output control 82 may be preset to allow 0–540 pulses per minute to be transmitted to the scale-of-six counter 85 in sixty pulses per minute steps. Likewise, since sixty pulses per minute are applied to the decade counter 79, the bank output control 83 may be preset to allow 0–54 pulses per minute to be applied to the scale-of-six counter 85 in six pulses per minute steps. From the foregoing, it may then be seen that any desired number of pulses per minute from 0–3594 may be applied to the scale-of-six counter, depending on the presetting of the bank output controls 81–83. The scale-of-six counter 85 is identical to the scale-of-six counter 77 and, therefore, provides an output pulse for every six input pulses applied thereto, the output of the scale-of-six counter being connected to the output terminal 76 which in turn is connected to a corresponding input terminal for the gate 66. Accordingly, any desired number of pulses per minute from 0–599 may be applied to the gate.

Figure 5:
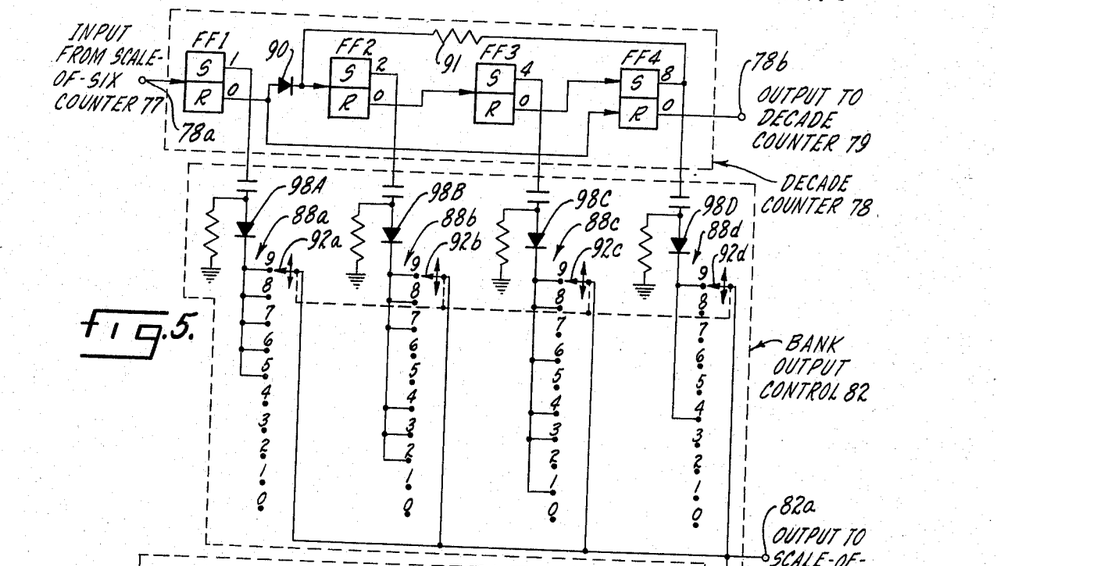
FIG. 5 is a schematic diagram of a decade counter arrangement utilized in the slope adjuster logic circuit of FIG. 4.

To aid in further understanding the operation of the slope adjuster logic circuit 70, the portion thereof enclosed in dotted lines, which includes the decade counter 78 and the bank output control 82, is illustrated in more detailed form in FIG. 5. Referring thereto, the decade counter 78 has an input terminal 78a and an output terminal 78b and includes four flip-flops FF1–FF4 which are arranged in the form of a "binary eight scaler," whereas the bank output control 82 has an output terminal 82a and includes four switch control banks 88a–88d, respectively associated with the flip-flops FF1–FF4.

The binary eight scaler is modified so that it operates as a decade counter. As may be seen by reference to FIG. 5, the first three flip-flop stages FF1–FF3 have inputs common to the "S" and "R" sections and the flip-flop FF4 has an "S" input and an "R" input. The input of the first stage flip-flop FF1 is connected directly to the input terminal 78a so that it responds to the application of input pulses thereto. The input terminals of the flip-flops FF2 and FF3 are respectively connected to the "R" output terminal of the next preceeding one of the flip-flop stages FF1 and FF2, the input of flip-flop FF2 being connected to the "R" output terminal of flip-flop FF1 through a diode 90 which functions as will be described hereinafter. The "S" input terminal of flip-flop FF4 is connected to the "R" output terminal of flip-flop FF3 and the "R" input terminal thereof is connected to the "R" output terminal of flip-flop FF1. Additionally, the input terminal of flip-flop FF2 is connected directly to the "S" output terminal of flip-flop FF4. The flip-flop stages illustrated in symbolic form in FIG. 5 are intended to correspond to the previously-described flip-flop stage illustrated in FIG. 1.

In general, the operation of the decade counter 78 is as follows, it being assumed that ten input pulses are applied to the input terminal 78a during this operational description. The decade counter 78 operates as a common binary eight scaler in response to the first eight input pulses provided at the input terminal 78a and, therefore, the operation for the first eight input pulses will be described in general terms. In response to the first, third, fifth and seventh input pulses, the flip-flop FF1 is driven to the set condition and, in response to the second, fourth, sixth and eighth input pulses, the flip-flop FF1 is driven to the reset condition. Since the input terminal of the flip-flop FF2 is connected to the "R" output terminal of flip-flop FF1, the flip-flop FF2 is driven to the set condition in response to the second and sixth input pulses and is driven to the reset condition in response to the fourth and eighth input pulses. In turn, the flip-flop FF3 is driven to the set condition in response to the fourth input pulse and is driven to the reset condition in response to the eighth input pulse, since its input terminal is connected to the "R" output terminal of the flip-flop FF2. The flip-flop FF4 is driven to the set condition in response to the eighth input pulse and, as may be seen by reference to FIG. 1, a ground signal is provided at the "S" output terminal thereof. The latter ground signal is transmitted to the input terminal of the flip-flop FF2 so that subsequently when the flip-flop FF1 is reset and a ground signal is provided at the "R" output terminal thereof, the ground signal will have no effect on the flip-flop FF2 due to the presence of the diode 90. The diode 90 is prevented from conducting when both sides thereof, i.e., the anode and the cathode, are at ground potential so that the ground signal provided at the "R" output terminal of the flip-flop FF1 is not transmitted to the "S" input terminal of the flip-flop FF2. Additionally, the diode 90 prevents the output signal provided at the "S" output terminal of the flip-flop FF4 from being applied to the "R" output terminal of the flip-flop FF1. A resistor 91 is interposed between the "S" output terminal of the flip-flop FF4 and the input terminal of the flip-flop FF2 to prevent the ground signal provided at the "S" output terminal of the flip-flop FF4 from affecting the flip-flop FF2.

Subsequently, in response to the ninth input pulse, the flip-flop FF1 is driven to the set condition and then, in response to the tenth input pulse, the flip-flop FF1 is reset. In response to the resetting of flip-flop FF1, the flip-flop FF4 is reset since the "R" input terminal thereof is connected to the "R" output terminal of flip-flop FF1 and a ground output signal is provided at the output terminal 78b which is connected to the "R" output terminal of flip-flop FF4, the output of the flip-flop FF1 not affecting the flip-flop FF2 due to the above-described effect of the output of flip-flop FF4 when it is set.

From the foregoing, it may be seen that the decade counter 78 provides an ouput pulse at the output terminal 78b for every ten input pulses applied to the input terminal 78a thereof and that, at the completion of the application of ten input pulses to the input terminal 78a, all of the flip-flops FF1–FF4 are in the reset condition so that the decade counter 78 is conditioned for another counting operation, the output terminal 78b corresponding to an input terminal to the decade counter 79.

The "S" output terminals of the flip-flops FF1–FF4 are respectively connected to the switch control banks 88a–88d in the bank output control 82. These banks 88a–88d selectively control the transmission of ground signals to the output terminal 82a when the respective flip-flops are driven to the set conditions. The switch control banks have steppable contact arms 92a–92d which are "ganged" together for concurrent movement so that the contact arms may be selectively and concurrently moved into engagement with associated ones of ten contact terminals sequentially numbered from 0–9, the numbers corresponding to the number of output pulses which will be provided at the output terminal 82a in response to the application of ten input pulses to the input terminal 78a of the decade counter 78 when the associated contact arms are in engagement with selected terminals. Diodes 98a–98d are interposed between the "S" output terminals of the flip-flops FF1–FF4 in the decade counter 78 and the switch control banks 88a–88d to prevent the transmission of negative pulses through the bank output control 82 when the flip-flops FF1–FF4 are reset so that only positive-going ground pulses are provided at the output terminal 82a.

A brief description of the operation of the bank output control 82 may be helpful in further understanding the operation of the present invention. For example, assume that the contact arms 92a–92d are in the "9" position illustrated in FIG. 5. Under such conditions, the "S" output terminals of all of the flip-flops FF1–FF4 are respectively connected to the output terminal 82a of the bank output control 82 through diodes 98a–98d and through the contact arms 92a–92d. Accordingly, every time one of the flip-flops FF1–FF4 is set, a positive-going ground pulse is provided at the output terminal 82a. As previously mentioned, flip-flop FF1 is set in response to the first, third, fifth, seventh and ninth input pulses, flip-flop FF2 is set in response to the second and sixth input pulses, flip-flop FF3 is set in response to the fourth input pulse and flip-flop FF4 is set in response to the eighth input pulse. It follows then that with the contact arms 92a–92d in the position shown, nine time-spaced output pulses are provided at the output terminal 82a of the bank output control 82 for every ten input pulses provided at the input terminal 78a of the decade counter 78.

As another example, let it be assumed that the contact arms 92a–92d are moved into the "5" position. Under these conditions, only the "S" output terminal of the flip-flop FF1 is connected to the output terminal 82a and, therefore, only five time-spaced output pulses are provided at the output terminal 82a for every ten input pulses applied to the input terminal 78a. In this manner the number of pulses passed from the decade counter 78 to output terminal 82a during each scaling cycle in response to ten input pulses may be selected to have any value between zero and nine by correspondingly positioning the arms 92a–92d.

The decade counter 79 and the associated bank output control 83 will operate in like manner. The operation of the scale-of-six counter 77 and the associated bank output control 81 will also be similar. However, the counter 77 will only include three flip-flop stages and the control 81 will accordingly include only three switch control banks. Since the details of the scale-of-six counter 77 and the bank output control 81 in and of themselves do not constitute a portion of the present invention, the details thereof will not be set forth. Suffice it to say that the scale-of-six counter is filled to provide an output pulse in response to every six input pulses and that the bank output control 81 may be preset so that from 0 to 5 output pulses are provided in response to every six input pulses.

As previously mentioned, the outputs from the bank output controls 81–83 are transmitted to the scale-of-six counter 85 which is identical to the scale-of-six counter 77. In turn, an output pulse is transmitted from the scale-of-six counter 85 to the gate 66 for every six input pulses applied thereto.

In view of the foregoing, it may be seen that a slope adjuster logic circuit 70 has been provided which allows for the transmission of input pulses to the start-stop temperature logic circuit 60 at any one of a wide range of rates, i.e., from 0 to 599 pulses per minute. This is a wide range of precisely defined rates and permits the controlled function to be varied from the initial operating level to the final operating level according to any one of 599 possible "ramps" or rates.

*Start-stop temperature logic circuit 60, initial temperature control 65, and final temperature control 72*

Figure 6:
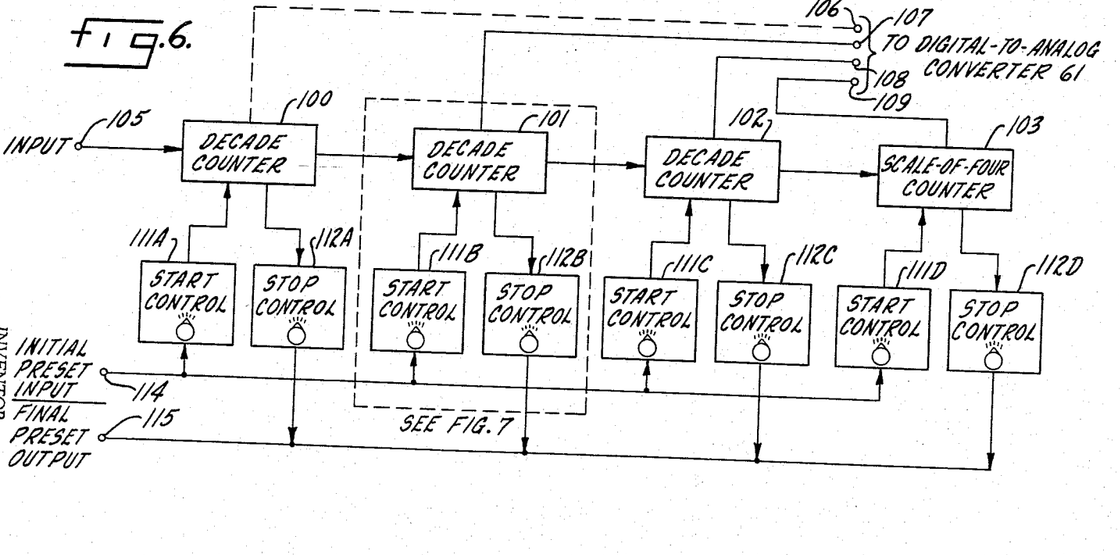
FIG. 6 is a more detailed block diagram of a start-stop preset temperature logic circuit utilized in the digital ramp programmer of FIG. 3.

FIG. 6 illustrates the relationship between the counter portion of the start-stop temperature logic circuit 60, the control elements of the initial temperature control 65, and the control elements of the final temperature control 72. Referring thereto, three decade counters 100–102 and a scale-of-four counter 103 are cascaded or connected in tandem to form the counter portion of the logic circuit 60, input pulses being transmitted to the first counter 100 through an input terminal 105. As previously mentioned, the digital outputs provided by the counters 100–103 are transmitted to the digital-to-analog converter 61 and, as may be seen, the digital outputs are transmitted thereto through output channels 106–109. In the illustrated embodiment, only the digital outputs of the counters 101–103 are transmitted to the digital-to-analog converter, though the digital output of the decade counter 100 may also be transmitted thereto as indicated by the dotted line channel 106.

The decade counters 100–102 are similar to the above-described decade counters 78 and 79 in the slope adjuster logic circuit 70 and the scale-of-four counter 103 is a binary four scaler corresponding to the first two stages of the decade counters. It follows then that the decade counter 100 is filled to provide an output in response to every ten input pulses applied to input terminal 105, the decade counter 101 is filled to provide an output in response to every one hundred input pulses applied to input terminal 105, the decade counter 102 is filled to provide an output in response to every one thousand input pulses applied to the input terminal 105, and the scale-of-four counter 103 is filled to provide an output in response to every four thousand input pulses applied to the input terminal 105. The total counting capacity is thus 4000 and the counters 100–103 are respectively the units, tens, hundreds and thousands counters.

For the purpose of presetting the count in the counters 100–103 so that an initial digital output is provided thereby which corresponds to the desired initial preset temperature level, a plurality of start control units 111a–111d are provided. The start control units comprise the counter controlling portion of the initial temperature control 65 as discussed hereinabove. Prior to the initiating of a desired controlling operation, the control units 111a–111d are preset so that, in response to the presence of a ground signal at an initial preset input terminal 114, the counters 100–103 are preset to the selected values. The initial temperature control 65 is so designed, as will become apparent later, that a ground signal is normally provided at the input terminal 114 and, accordingly, the counters are so preset. Subsequently, when the start push button 67 is depressed (see FIG. 3), the gate 66 is opened and the ground signal is removed so that the start control units 111a–111d no longer control the count in the counters 100–103.

For the purpose of preventing the further transmission of input pulses to the input terminal 105 when the count in the counters 100–103 attains a value corresponding to a desired final preset temperature level, a plurality of stop control units 112a–112d are provided which are preset to be rendered operative when the desired count is attained. The stop control units 112a–112d comprise the gate closing portion of the final temperature control 72 in FIG. 3. When all of the stop control units have been rendered operative, a ground signal is provided at a final preset output terminal 115 which is transmitted to the gate 66, the ground signal causing the gate to be closed so that the further transmission of input pulses to the input terminal 105 is prohibited. The stop control units 112a–112d are so related electrically that a ground signal is provided at the stop preset output terminal 115 only when all the stop control units have been rendered effective or operative. In essence, the control units 112a–112d function as if electrically connected in series so that the series arrangement appears open-circuited when all the control units are not operative and a ground signal is not provided at output terminal 115.

Figure 7:
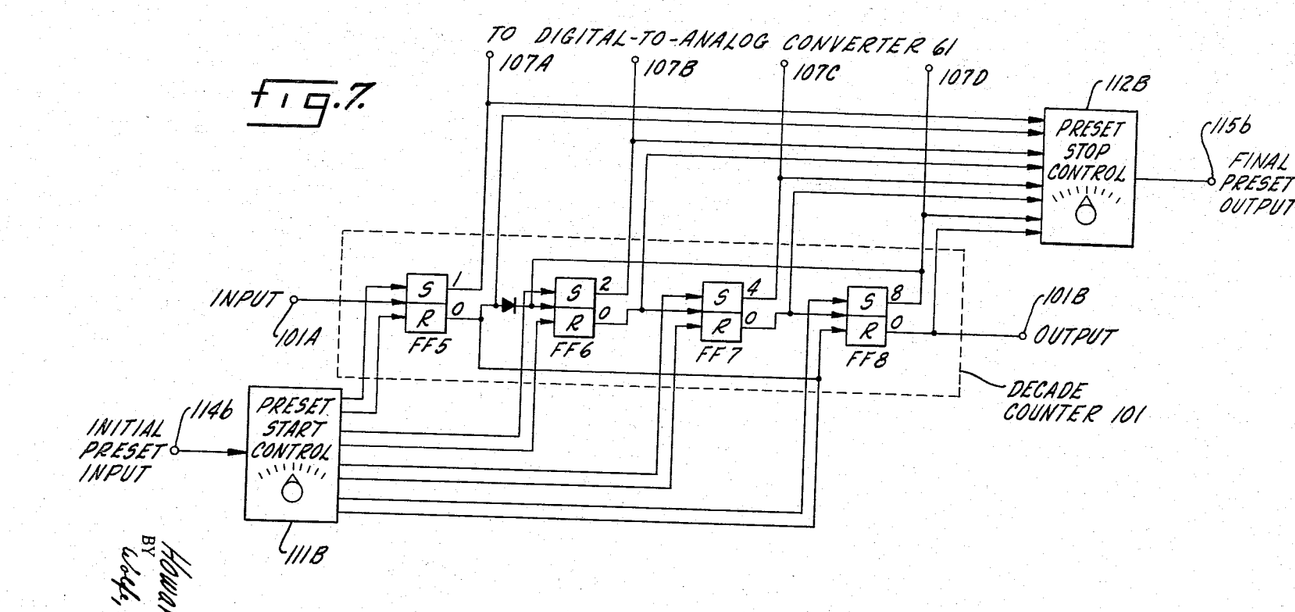
FIG. 7 is a schematic diagram of a decade counter arrangement utilized in the start-stop temperature logic circuit of FIG. 6.

To aid in better understanding the operation of the circuitry illustrated in block form in FIG. 6, the portion thereof enclosed in dotted lines, which includes the decade counter 101, the start control unit 111b, and the stop control unit 112b, is illustrated in more detailed form in FIG. 7. Referring thereto, it may be seen that the decade counter 101 includes four flip-flop stages FF5–FF8 and corresponds to the previously-described decade counter 78 illustrated in FIG. 5. Accordingly, the decade counter 101 operates as the decade counter 78 in response to the application of input pulses to an input terminal 101a so that, if the decade counter 101 is initially at a zero setting, an output pulse is provided at an output terminal 101b when ten input pulses have been applied to the input terminal 101a. However, in this arrangement, "S" and "R" input terminals of the flip-flops FF5–FF8 are associated with the preset start control unit 111b, so that the flip-flops FF5–FF8 may be placed in desired set and reset conditions at the beginning of a controlling operation. Thus, an initial count representative of the initial preset temperature level may be set into the counter 101. The preset start control unit 111b is preset to apply a ground or positive input pulse either to the "S" input terminal or to the "R" input terminal of each of the flip-flops FF5–FF8 so that the flip-flops FF5–FF8 are initially either set or reset. In response to the preset count, the temperature in the furnace is brought up to the desired initial preset temperature level. As will become more apparent later, the control unit 111b is rendered ineffective when the "start" push button 67 is depressed. Since the preset start control unit 111b may take any of a variety of specific forms familiar to those skilled in the art, such details thereof will not be set forth. Suffice it to say that any desired device may be utilized which may be preset to selectively apply positive or ground input pulses to the "S" and "R" input terminals of the flip-flops FF5–FF8. For example, a rotary contact bank may be utilized for selectively applying the pulses to the flip-flops.

The "S" and "R" output terminals of the flip-flops FF5–FF8 are connected to the input of the preset stop control unit 112b and the "S" output terminals are also connected to output channels 107a–107d which are associated with the digital-to-analog converter 61. The preset stop control unit 112b is preset to provide a positive-going ground output pulse when ground output pulses have been provided at selected ones of the "S" and "R" output terminals of the flip-flops FF5–FF8, this indicating that the count in the counter 101 corresponds to the presetting of the control unit 112b. However, as previously mentioned, the control units 112a–112d are so related electrically that a ground signal is not provided at the output terminal 115 until all the control units are rendered effective. Like the preset start control unit 111b, the preset stop control unit 112b may take any desired form familiar to those skilled in the art and, therefore, the details thereof are not set forth. Suffice it to say that the preset stop control unit 112b is rendered effective only when ground input pulses are applied to selected ones of the input terminals associated therewith. The preset stop control unit 112b, may for example, also include a rotary contact bank.

In general, the operation of the circuitry illustrated in FIG. 7 is as follows. Let it be assumed that the decade counter 101 is to be preset to have a 4 count therein and that the preset stop control unit 112b is to be preset to respond to an 8 count in the decade counter 101. Under these conditions, the preset start control unit 111b is preset to apply a ground or positive signal to the "S" input terminal of the flip-flop FF7 since, for a 4 count, the first, second and fourth stage-flops FF5, FF6 and FF8 are to be in the "reset" conditions and the third stage flip-flop FF7 is to be in the "set" condition. Accordingly, due to the presence of the ground signal at input terminal 114 prior to the push button 67 being depressed, the flip-flop FF7 is set while the other flip-flops FF5, FF6 and FF8 remain reset. Thereafter, the push button 67 is depressed so that the start control unit 111b no longer affects the counter 101 and input pulses are applied to the input terminal 105 of the start-stop temperature logic circuit 60 (FIG. 6) which are applied to the counter 101.

In response to the application of input pulses to the input terminal 101a, the decade counter 101 will operate as described hereinabove with respect to the decade counter 78 in FIG. 5, except that it starts with a "4" count therein. The preset stop control unit 112b has been preset to respond to an 8 count in the counter 101 and has, accordingly, been preset to be rendered operative when ground signals are provided at the "R" output terminals of the first three stage flip-flops FF5–FF7 and when a ground output signal is provided at the "S" output terminal of the fourth stage flip-flop FF8. It follows that, when four input pulses have been applied to the input terminal 101a, the flip-flops FF5–FF8 will be conditioned to provide such output signals and the preset stop control unit 112b will be rendered operative. Subsequently, in response to every ten input pulses, the preset stop control unit 112b will again be rendered operative.

In view of the foregoing, it may be seen that an initial preset temperature control 65 has been provided which allows for the presetting of the counter in the start-stop logic circuit 60 to any one of a wide range of values, i.e., from 0 to 4000. Also, a final preset temperature control 72 has been provided which allows for preventing the further transmission of pulses to the counter when a selected count having any one of a wide range of values from 0 to 4000 has been attained therein. These are wide ranges of precisely defined values and, accordingly, the initial and final furnace temperatures may be preset to precise values within a wide range.

Additionally, in view of the above-described operation of the flip-flop stages (FIG. 1), it will be apparent that ground signals are provided at the output channels 107a–107d when the associated flip-flops are set and negative signals are provided thereat when the associated flip-flops are reset.

*Digital-to-analog converter 61 and control bridge circuit 62*

Figure 8:
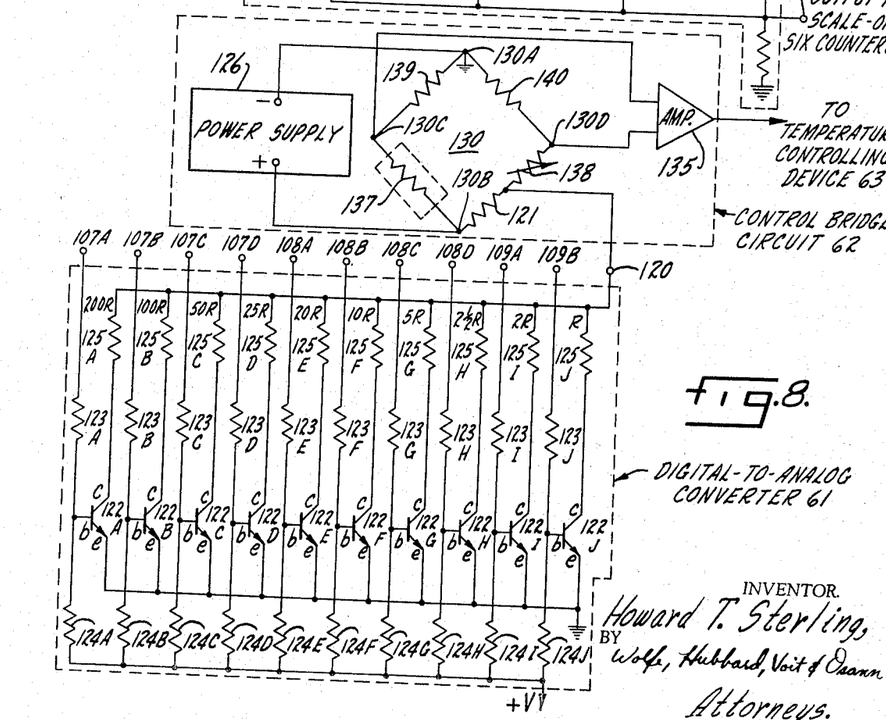
FIG. 8 is a schematic diagram of a digital-analog converter circuit and a bridge circuit utilized in the digital ramp programmer of FIG. 3.

The digital-to-analog converter 61 and the control bridge circuit 62 illustrated in block form in FIG. 3 are shown in more detail in FIG. 8. Referring thereto, it may be seen that the digital-to-analog converter 61 has a plurality of input channels 107a–107d, 108a–108d, 109a and 109b, and has an output terminal 120 which corresponds to the input terminal of the control bridge circuit 62. Input channels 107a–107d correspond to the output channels 107a–107d associated with the "S" output terminals of the flip-flops FF5–FF8 of the decade counter 101 in FIG. 7. In like manner, the input channels 108a–108d correspond to the output channels associated with the "S" output terminals of the flip-flops in the decade counter 102 illustrated in block form in FIG. 6 and the input channels 109a and 109b correspond to the output channels associated with the "S" output terminals of the flip-flops in the scale-of-four counter 103 in FIG. 6, the scale-of-four counter 103 only having two such output terminals since it corresponds to only the first two stages of the decade counters.

For the purpose of responding to ground signals provided in the input channels of the digital-to-analog converter 61, a plurality of transistors 122a–122j are provided which are of the NPN type. The transistors 122a–122j control the flow of current from the positive terminal of a power supply 126 in the control bridge circuit 62 through a control resistor 121 therein, as will become apparent. The emitters of the transistors are all tied to ground and the collectors thereof are respectively tied to the output terminal 120 through current limiting resistors 125a–125j, the values of resistors 125a–125j being such that the resistor 125a has the largest value and each subsequent resistor has a smaller value, resistor 125j having the smallest value. Accordingly, it may be seen that when the transistors 122a–122j are rendered conductive, the greatest amount of current will flow through transistor 122j with the current flowing through each succeeding transistor decreasing, the least current flowing through transistor 122a.

The bases of the transistors 122a–122j are respectively connected to the associated input terminals through resistors 123a–123j and are respectively connected to a positive source, designated as "+V," through resistors 124a–124j, the pair of resistors associated with each base functioning as a voltage divider network. The values of the resistors in the voltage divider networks are so selected that, when a negative signal is applied to an input terminal from the "S" output terminal of the associated flip-flop in the associated counter, the associated one of the transistors 122a–122j is rendered or maintained non-conductive since its base is driven or maintained negative with respect to the emitter thereof. Conversely, when a ground signal is applied to the associated input terminal, the bases of the associated transistors 122a–122j are driven positive with respect to the emitter so that the transistor is rendered conductive and current is caused to flow from the positive terminal of the power supply 126 in the control bridge circuit 62 through the control resistor 121, through terminal 120, through the associated current limiting resistors 125a–125j and through the collector-emitter circuit of the transistor.

From the foregoing, it may be seen that the amount of current flowing through the control resistor 121 is dependent upon which of the transistors 122a–122j are conductive, which in turn is dependent upon which of the flip-flops in the associated counters are in the set conditions. Therefore, the analog output signal provided by the digital-to-analog converter 61 in response to the digital outputs of the counters 101–103 is in the form of current caused to flow through the control resistor 121 in the control bridge circuit 62. Further, it may be seen that as the count in the counters 101–103 increases, different ones of the transistors 122a–122j are rendered conductive so that the current flowing through the control resistor 121 increases in a stepping fashion in direct relationship to the step-like increase of the count in the counters 101–103. The analog voltage across the resistor 121 is thus proportional to the count held in the counter stages 101, 102, and 103.

In actual practice, resistors 124a–124j have been provided which have values approximately twice the value of the resistors 123a–123j. Additionally, resistors 125a–125j are selected such that the relationships are as illustrated in FIG. 8, wherein R is a selected resistance value such as 1500 ohms.

Referring now to the control bridge circuit 62, it may be seen that a resistance bridge network 130 is provided having a pair of input terminals 130a and 130b and a pair of output terminals 130c and 130d. The negative and positive output terminals of the power supply 126 are respectively connected to the input terminals 130a and 130b of the bridge network 130 and the output terminals 130c and 130d are connected to the input of an amplifier 135 which drives the temperature controlling device 63 illustrated in block form in FIG. 3. A temperature sensing resistor 137 is provided in one leg of the bridge network 130 which has a resistive value directly proportional to the temperature in the furnace being controlled since the resistor 137 is to be thermally coupled to the furnace in a desired manner. The previously-mentioned control resistor 121 forms a portion of one leg of the bridge network 130, a variable resistor 138 forming the other portion thereof, and the input terminal 120 is connected to the common junction of resistors 121 and 138. Constant resistors 139 and 140 are provided to form the remaining two legs of the bridge network 130. For the purpose of controlling the effect of current flowing through the resistor 121 to the digital-to-analog converter 61, the resistor 138 is made variable so that the effect of current flow through the control resistor 121 may likewise be varied.

Briefly speaking, the digital-to-analog converter 61 and the control bridge circuit 62 operate as follows. At the beginning of a controlling operation counters 101–103 in the start-stop temperature logic circuit 60 are preset to have a predetermined count therein so that selected flip-flops are driven to the set conditions causing associated ones of the transistors 122a–122j in the digital-to-analog converter 61 to be rendered conductive. Accordingly, prior to the beginning of the controlling operation a preselected amount of current flows from the positive terminal of the power supply 126 through the control resistor 121 to the digital-to-analog converter 61 causing the bridge network 130 to be unbalanced so that an output is provided thereby which is transmitted to the amplifier 135. Since the output of the amplifier 135 is transmitted to the temperature controlling device 63, the temperature controlling device is rendered operative to cause heat to be applied to the furnace. As the furnace begins to heat up, the resistance of the temperature sensing resistor 137 in the bridge network changes causing the bridge network to tend to balance as the temperature in the furnace approaches the temperature level determined by the presetting of the counters in the start-stop temperature logic circuit 60 and balance of the bridge network 130 occurs when the temperature attains the initial preset temperature level.

Subsequently, when the operation is initiated by depressing the push button 67, pulses are applied to the counter circuit in the start-stop temperature logic circuit 60 at a rate dependent upon the presetting of the slope adjuster logic circuit 70 so that the count therein is increased at a predetermined rate. As the count in the counters increases, the transistors 122a–122j are selectively rendered conductive and nonconductive so that the current flowing through the control resistor 121, and thus the voltage developed thereacross, increases in a step-like fashion in accordance with the increasing count. As the voltage drop across the control resistor increases, the bridge network 130 is continually being unbalanced and the temperature controlling device 63 is continually being rendered operative. During this time, the temperature in the furnace is continually being increased and the resistive value of the sensing resistor 137 increases in direct relationship therewith so that it tends to balance the bridge network 130 which in turn is continually unbalanced by the increasing current flow through the control resistor 121.

When the count in the counters 100–103 attains the preset value corresponding to the desired final preset temperature level, the further increase of count therein is prohibited so that the further increase in current flow through the resistor 121 is also prohibited. Subsequently, there is no tendency for the bridge 130 to be unbalanced, except due to heat losses which cool the sensing resistor 137. Thus, the bridge circuit automatically maintains the controlled temperature at the desired final value.

In view of the foregoing, it may be seen that the rate at which the temperature in the furnace is increased is directly proportional to the rate at which current flowing through the control resistor 121 to the digital-to-analog converter 61 is being increased, which in turn is directly proportional to the rate at which the count in the counters 100–103 is being increased. Accordingly, it may be seen that the rate, i.e., the slope of the curve portion 50b in FIG. 2, at which the temperature in the furnace is driven from the initial preset temperature level to the final preset temperature level is controlled by he slope adjuster logic circuit 70 since it controls the rate at which input pulses are applied to the counter in the start-stop temperature logic circuit 60.

*Control circuit*

For the purpose of controlling the starting and stopping operations of the digital ramp programmer as set forth hereinabove, a control circuit 145 is illustrated in schematic form in FIG. 9 which includes the gate 66 and portions of the start-stop temperature logic circuit 60, the initial temperature control 65 and the final temperature control 72. In addition to including the start push button 67, the control cirçiut includes a reset push button 150 which, when depressed, causes the temperature in the furnace to be reset to the initial reset temperature level and includes a stop push button 151 which, when depressed, causes the digital ramp programmer to cease functioning so that the temperature in the furnace is maintained at the temperature level when the stop push button is depressed.

The control circuit 145 includes a pair of flip-flops FF10 and FF11 which respectively include transistors 155, 156 and 157, 158 and which correspond to the previously-described flip-flop illustrated in FIG. 1. Prior to the beginning of a controlling operation, the flip-flops FF10 and FF11 are so conditioned that transistors 156 and 158 are normally conducting. To initiate a controlling operation, the start push button 67 is depressed causing a ground signal to be transmitted through a diode 160 to the collector of the nonconducting transistor 155 in the flip-flop FF10 and through a diode 161 to the collector of the nonconducting transistor 157 in the flip-flop FF11. In response to the ground signals, the operating states of the flip-flops FF10 and FF11 are reversed.

Additionally, the ground signal transmitted through the diode 160 affects the operation of an initial preset controlling transistor 165. During the time prior to the depressing of the start push button 67, the transistor 165 is conducting so that a ground output signal is provided at an intial preset output terminal 114 connected to the collector of the transistor which causes the above-described start control units 111a–111d in the initial temperature control to be normally operative. The base of transistor 165 is connected to the center terminal of a voltage divider consisting of resistors 166 and 167 which is normally at a negative potential. The emitter of transistor 165 is connected directly to ground so that the transistor 165 is normally conducting, the voltage divider being connected between a positive potential, designated as "+V," and the collector of normally non-conducting transistor 155 which is thus at a negative potential. The values of the transistors 166 and 167 are such that the center terminal is normally at a negative potential. In response to the ground signal transmitted through the diode 160, the transistor 165 is rendered nonconductive since the base thereof is driven positive with respect to the emitter due to the voltage dividing effect of resistors 166 and 167.

The start preset output terminal 114 is also connected to a negative voltage source, designated as "—V," through a resistor 168. Accordingly, it may be seen that when the transistor 165 is normally conducting, a ground output signal is provided at the start preset output terminal 114 whereas, when the transistor 165 is rendered nonconductive, a negative output signal corresponding in value to the negative potential —V is provided at the output terminal 114. Since the start preset output terminal 114 connects to the start control units 111a–111d shown in FIG. 6, the ground signal and the negative signal are applied to the start control units. A previously set forth, the control units 111a–111d are rendered operative by the ground output signal to preset the counters 100–103 to the counts preset in the start control units so that the temperature in the furnace is brought up to the initial preset temperature level. Conversely, when the push button 67 is depressed causing the transistor 165 to be rendered nonconductive so that a negative output signal is provided at the output terminal 114, the start control units 111a–111d no longer affect the counters 100–103.

As mentioned above, the operation of the flip-flop FF11 is also reversed in response to the depressing of the start push button 67 so that transistor 158 is rendered nonconductive and transistor 157 is rendered conductive. The gate 66 illustrated in block form in FIG. 3 is associated with flip-flop FF11 and responds to the reversing operation thereof. Referring again to FIG. 9, the gate 66 includes a gate input terminal 76 corresponding to the output terminal of the scale-of-six counter 85 in FIG. 4, a gate output terminal 105 corresponding to the input terminal of the decade counter 100 in FIG. 6, and diode 170 having its anode connected to the input terminal 76 and its cathode connected to the output terminal 105. Additionally, the output terminal 105 is connected to the collector of transistor 158 through a resistor 172. As previously mentioned hereinabove with respect to the operation of the slope adjuster logic circuit 70, positive-going ground output pulses are provided at the output terminal 76 (gate input terminal) at a predetermined rate. Accordingly, in order for the pulses provided by the slope adjuster logic circuit to be transmitted through the diode 170, the cathode of the diode 170 and thus the collector of transistor 158 must be negative with respect to the input pulses, i.e., must be below ground potential. Prior to the initiation of the operation of the digital ramp programmer when the transistor 158 is in the conducting state, the collector thereof is clamped to ground so that the cathode of the diode 170 is at ground potential. Thus, the transmission of pulses from the logic circuit 70 through the diode 170 is prohibited. Subsequently, when the start push button 67 is depressed and the transistor 158 is rendered nonconductive, the potential at the collector thereof rises towards the negative potential, designated as "−V," so that the cathode of the diode 170 is driven negative and the transmission of positive-going pulses from the slope adjuster logic circuit therethrough is permitted. Thus, it may be seen that, in response to the reversing of the operation of the flip-flop FF11 as the start push button 67 is depressed, ground pulses are permitted to be transmitted from the logic circuit 70 through the diode 170 to the counter portion of the logic circuit 60.

Figure 9:
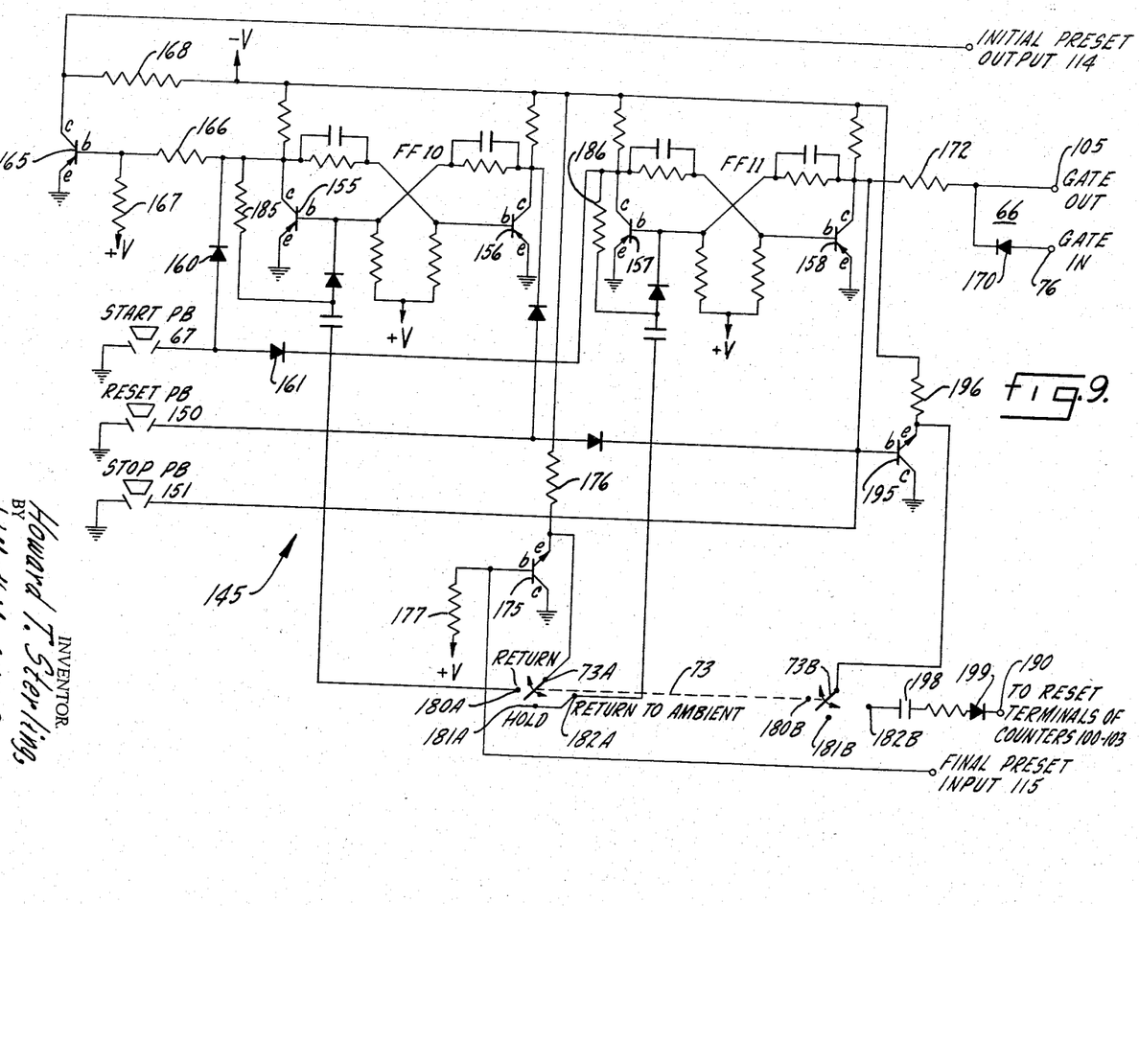
FIG. 9 is a schematic diagram of a start-stop logic control circuit for the digital ramp programmer illustrated in FIG. 3.

As described in conjunction with the operation of the circuitry illustrated in FIG. 6, when a count corresponding to the desired final preset temperature level is attained in the counters 100–103, all of the stop control units 112a–112d are rendered operative so that a ground output pulse is provided at the stop preset output terminal 115 which corresponds to the stop preset input terminal 115 of the control circuit 145 in FIG. 9. In response to the ground pulse or signal, a normally conducting gate closing transistor 175 is rendered non-conductive. The transistor 175 is of the NPN type and is normally conductive since its emitter is connected to the negative potential −V through a current limiting resistor 176 and its base is connected to a positive potential, designated as "+V," through a resistor 177.

The previously-mentioned control switch 73, illustrated in FIG. 3, is associated with the emitter of the transistor 175 for controlling the effect of the transistor 175 on the control circuit 145 when the transistor is rendered nonconductive. The control switch 73 includes a pair of contact arms 73a and 73b which are "gang-connected" together for concurrent operation and three contacts are associated with each contact arm which are accordingly paired up. One pair of contacts 180a and 180b is designated as "return" contacts so that, when the contact arms 73a and 73b are in engagement therewith, the temperature in the furnace is returned to the initial preset temperature level upon the final preset temperature level being attained; a second pair of contacts 181a and 181b is designated as "hold" contacts so that, when the contact arms 73a and 73b are in engagement therewith, the temperature in the furnace is maintained at the final preset temperature level once this temperature level is attained; and a third pair of contacts 182a and 182b is designated as "return to ambient" contacts so that, when the contact arms 73a and 73b are in engagement therewith, the temperature in the furnace is returned to ambient condition upon the final preset temperature level being attained.

The arm 73a is connected directly to the emitter of transistor 175 so that, when the transistor is rendered nonconductive in response to the application of a ground input signal to the stop preset input terminal 115 (indicating that the final preset temperature level has been attained), a negative pulse is provided at the arm 73a. When the contact arm 73a is in engagement with the "return" contact 180a, the negative pulse is transmitted through a resistor 185 to the collector of transistor 155 and, thus, to the base of transistor 156 in the flip-flop FF10. In response thereto, reversing action of the flip-flop FF10 takes place so that transistor 155 is rendered nonconductive and transistor 156 is rendered conductive. Additionally, the negative signal is transmitted through resistor 185 to the base of the initial preset controlling transistor 165, causing the transistor 165 to again be rendered conductive so that a ground signal is again provided at the initial preset output terminal 114. The ground signal is in turn transmitted to the start control units 111a–111d and causes the control units to again be rendered operative so that the counters 100–103 in the start-stop temperature logic circuit 60 are again set to the counts corresponding to the initial preset temperature level. Under these conditions, the gate 66 is still open so that pulses are still transmitted to the counters 100–103, but the control units 111a–111d respond to the ground signal at terminal 114 to prevent the counters from counting. Accordingly, the furnace may cool down (see 50d in FIG. 2) until it reaches the initial preset temperature level. Thereafter, the bridge will hold the furnace at the initial temperature level.

When the contact arm 73a is in engagement with the "hold" contact 181a and the transistor 175 is rendered nonconductive in response to the final preset temperature level being attained, a negative pulse is applied through a resistor 186 to the collector of transistor 157 and, thus, to the base of transistor 158 in the flip-flop FF11 causing reversing operation of the flip-flop FF11 to take place so that transistor 157 is rendered nonconductive and transistor 158 is rendered conductive. When this reversing action of the flip-flop FF11 takes place, the collector of transistor 158 is clamped to ground so that the further transmission of pulses through the diode 170 in the gate 66 is prohibited. Accordingly, the temperature in the furnace will be maintained at the final preset temperature level upon this temperature level being attained, if the control switch 73 is preset so that the contact arm 73a engages the "hold" contact terminal 181a.

Finally, if the contact arm 73a is in engagement with the "return to ambient" contact terminal 182a and the transistor 175 is rendered nonconductive in response to the final preset temperature level being attained, the reversing operation of the flip-flop FF11 takes place as when the contact arm is in engagement with the "hold" contact terminal 181a, so that transistor 157 is rendered nonconductive and transistor 158 is rendered conductive and so that the further transmission of pulses through the diode 170 of the gate 66 is prohibited. Additionally, when the contact arm 73a is in engagement with contact terminal 182a, the contact arm 73b is in engagement with contact terminal 182b so that an output terminal 190, associated with the "R" input terminals of the counters 100–103, is associated with the emitter of a counter resetting transistor 195. The emitter of the transistor 195 is connected to the negative potential −V through a current limiting resistor 196 and the base thereof is tied to the collector of transistor 158.

Accordingly, during the controlling operation of the digital ramp programmer when the transistor 158 is nonconductive and its collector is at a negative potential corresponding to the negative potential −V, transistor 195 is nonconductive and the potential at the emitter thereof which is transmitted to the output terminal 190 corresponds to the negative potential −V, the sustained negative signal having no effect on the counters 100–103 because of the presence of a capacitor 198 and a diode 199 interposed between the emitter of transistor 195 and the output terminal 190. Subsequently, when the operation of the flip-flop FF11 is reversed and the transistor 158 is rendered conductive so that its collector is clamped to ground, the transistor 195 is rendered conductive so that its emitter is clamped to ground, and a ground output pulse is provided at the output terminal 190 which is transmitted to the "R" input terminals of the counters 100–103 causing the counters 100–103 to be reset to zero counts. Under these circumstances, the temperature controlling bridge 63 lets the furnace cool to ambient temperature upon the final preset temperature level being attained.

Accordingly, it may be seen that the digital ramp programmer may be preset (1) to maintain the temperature at the final preset temperature level, (2) to return the temperature in the furnace to the initial preset temperature level, or (3) to return the temperature in the furnace to ambient condition once the final preset temperature level has been attained.

If during a controlling operation, the reset push button 150 is depressed, a ground signal is applied to the collector of transistor 156 which is connected to the base af transistor 155 so that the operation of the flip-flop FF10 is reversed causing transistor 155 to be rendered nonconductive and the transistor 156 to be rendered conductive. Additionally, the ground signal is applied to the collector of transistor 158 in the flip-flop FF11 causing reversing action thereof since the base of transistor 157 is connected to the collector of transistor 158 so that transistor 157 is rendered nonconductive and transistor 158 is rendered conductive. The ground signal is also applied to the base of the counter resetting transistor 195 so that the transistor is rendered conductive and a ground signal is applied to the contact arm 73b of the control switch 73, the ground signal being applied to the "R" input terminals of the counters 100–103 to cause resetting thereof only if the control switch 73 was preset to have its contact arms 73a and 73b in engagement with the "return to ambient" contact terminals 182a and 182b. If the contact arms are not in engagement with the "return to ambient" contacts, it follows that, in response to the reversing operation of the flip-flop FF11, the gate 66 is closed so that further transmission of pulses therethrough is prohibited and that, in response to the reversing operation of the flip-flop FF10, transistor 165 is rendered conductive so that the start control units 111a–111d are again rendered operative causing the counters 100–103 to be reset to values corresponding to the initial preset temperature level. Accordingly, the temperature in the furnace is returned to the initial preset level.

When the stop push button 151 is depressed during a controlling operation and the contact arms are not in engagement with the "return to ambient" contacts, the flip-flop FF11 will be affected as when the reset push button is depressed, but the flip-flop FF10 will not be affected. Accordingly, the further transmission of pulses through the gate 66 is prohibited and the temperature in the furnace will be maintained at the level therein when the stop push button 151 was depressed.

Thus, it may be seen that the digital ramp programmer may be reset in the middle of a controlling operation to the initial operating level or that the operation of the digital ramp programmer may be stopped in the middle of a controlling operation.

In view of the foregoing, it may be seen that a digital ramp programmer has been provided for precisely controlling the change in a desired condition from an initial operating level to a final operating level. The initial preset control 65 allows for presetting the initial operating level over a wide range and the final preset control 72 allows for presetting the final operating level over a wide range. Additionally, the slope adjuster logic circuit 70 allows for varying the rate at which the condition is changed over a wide range such that a wide range of "ramps" or slopes are available.

In the preamble of the claims, the term "digital ramp programmer" has been set forth. It is to be understood that the term "ramp" is not intended to be limited to varying the condition according to a linear function, but rather is also intended to cover varying the condition according to a nonlinear function.

I claim as my invention:

1. In a digital ramp programmer for controlling the operating level of a condition which is initially at an ambient condition, the combination which comprises digital means for providing a digital signal having a value representative of a desired operating level, a control device responsive to the digital signal for controlling the operating level of the condition in accordance with the instantaneous value thereof, means associated with the digital means for initially causing the digital signal to have a value representative of a desired initial operating level, means associated with the digital means for limiting the value of the digital signal to a value representative of a desired final operating level, means for causing the digital signal to be varied from the value representative of the initial operating level to the value representative of the final operating level at a desired rate, and means responsive to the condition attaining the final operating level for causing the condition to be returned to the ambient condition when rendered operative.

2. In a digital ramp programmer for controlling the operating level of a condition which is initially at an ambient condition, the combination which comprises digital means for providing a digital signal having a value representative of a desired operating level, a control device responsive to the digital signal for controlling the operating level of the condition in accordance with the instantaneous value thereof, means associated with the digital means for initially causing the digital signal to have a value representative of a desired initial operating level, means associated with the digital means for limiting the value of the digital signal to a value representative of a desired final operating level, means for causing the digital signal to vary from the value representative of the initial operating level to the value representative of the final operating level at a desired rate, and control means preset to respond to the condition attaining the final operating level for alternatively causing the condition (1) to revert to ambient condition, (2) to revert to the initial condition, or (3) to be maintained at the final condition, whereby the programmer is capable of causing either of the three said conditions for which it is preset.

3. In a digital ramp programmer for controlling the operating level of a condition between an initial operating level and a final operating level, the combination which comprises digital means including a counter for providing a digital output representative of a desired operating level, a digital-to-analog converter associated with the digital means for converting the digital output into an analog signal having an amplitude representative of the desired instantaneous operating level, a control device responsive to the analog signal for controlling the operating level of the condition in accordance with the amplitude thereof, means for presetting the counter to a count representative of a desired initial operating level, means for limiting the count which may be attained in the counter to a value representative of a desired final operating level, and means for applying a series of pulses to the digital means at a predetermined exact rate so that the digital output of the counter is varied from the value representative of the initial operating level to the value representative of the final operating level.

4. In a digital ramp programmer for controlling the operating level of a condition between an initial operating level and a final operating level, the combination which comprises digital means including a counter for providing a digital output representative of a desired operating level, a digital-to-analog converter associated with the digital means for converting the digital output into an analog signal having an amplitude representative of the desired instantaneous operating level, a control device responsive to the analog signal for controlling the operating level of the condition in accordance with the amplitude thereof, means for presetting the counter to a count representative of a desired initial operating level, means for limiting the count which may be attained in the counter to a value representative of a desired final operating level, means for applying a series of pulses to the digital means at a predetermined exact rate so that the digital output of the counter is varied from the value representative of the initial operating level to the value representative of the final operating level, and means for selectively determining the frequency of the series of pulses independently of the concurrent operating level of said condition so that the rate of change in the amplitude of the analog signal and the rate of change of the condition are correspondingly adjusted.

5. In a digital ramp programmer for controlling the operating level of a condition between an initial operating level and a final operating level, the combination which comprises a plurality of counters arranged to provide a digital output representative of the count therein, a digital-to-analog converter associated with the counters for converting the digital output into an analog input signal having an amplitude representative of the instantaneous value thereof, a control device responsive to the analog signal for controlling the operating level of the condition in accordance with the amplitude thereof, means for presetting the counters to provide a digital output representative of a desired initial operating level, means for limiting the maximum digital output of the counters to a value representative of a desired final operating level, and means associated with the counters for varying the settings thereof at a predetermined exact rate so that the digital output is varied from the value representative of the initial operating level to the value representative of the final operating level.

6. In a digital ramp programmer for controlling the operating level of a condition between an initial operating level and a final operating level, the combination which comprises digital means including a counter responsive to the application of pulses thereto for providing a digital output representative of the count in the counter, a digital-to-analog converter associated with the digital means for converting the digital output into an analog signal having an amplitude representative of the instantaneous value thereof, a control device responsive to the analog signal for controlling the operating level of the condition in accordance with the amplitude thereof, means for presetting the counter to a count representative of a desired intial operating level, means for limiting the count which may be attained in the counter to a value representative of a desired final operating level, an adjustable source of pulses for producing pulses at a selectable preset frequency within a wide range, means including a gate for controlling the transmission of pulses from the source to the digital means when the gate is opened, means for opening the gate to initiate operation of the counter, and means for regulating the rate at which pulses are provided by the source so that the count in the counter is varied from the value representative of the initial operating level to the value representative of the final operating level at a desired rate upon the gate being opened.

7. In a digital ramp programmer for controlling the operating level of a condition between an initial operating level and a final operating level, the combination which comprises digital means including a first counter responsive to the application of pulses thereto for providing a digital output representative of the count in the counter, a digital-to-analog converter associated with the digital means for converting the digital output into an analog signal having an amplitude representative of the instantaneous value thereof, a control device responsive to the analog signal for controlling the operating level of the condition in accordance with the amplitude thereof, means for presetting the counter to a count representative of a desired initial operating level, means for limiting the count which may be attained in the counter to a value representative of a final operating level, a source of pulses, means including a gate for controlling the transmission of pulses from the source to the digital means when the gate is opened, means for opening the gate to initiate an operation, and means including a second counter for regulating the rate at which pulses are permitted to pass through the gate so that the count in the first counter is varied from the value representative of the initial operating level to the value representative of the final operating level at a desired rate upon the gate being opened.

8. In a digital ramp programmer for controlling the operating level of a condition between an initial operating level and a final operating level, the combination which comprises digital means including a counter responsive to the application of pulses thereto for providing a digital output representative of the count in the counter, a digital-to-analog converter associated with the counter for converting the digital output into an analog signal having an amplitude representative of the instantaneous value thereof, a control device responsive to the analog signal for controlling the operating level of the condition in accordance with the amplitude thereof, means for presetting the counter to a count representative of a desired initial operating level, a source of pulses, means for applying the pulses provided by the source to the digital means and for regulating the rate at which pulses are applied thereto so that the count in the counter is varied at a desired rate, and means including a gate responsive to the count in the counter attaining a value representative of a desired final operating level for prohibiting the further transmission of pulses to the digital means.

9. In a system for controlling the value of an analog signal provided to control a condition to be varied, the combination which comprises a source of pulses having a frequency which is variable, a counter, adjustable digital means for setting an initial count into the counter, means for transmitting the pulses from the source to the counter, adjustable digital means associated with the counter for responding to a desired final count in the counter to terminate the operation of the transmitting means, and digital to analog converter means receiving a digital signal only from said counter for producing an analog signal representative of said digital signal.

10. In a system for controlling the value of an analog signal provided to control a condition to be varied, the combination which comprises a source of pulses having a constant frequency, a counter, adjustable frequency divider means for receiving the pulses from the source and for transmitting pulses to the counter at a selectable preset frequency within a wide range, adjustable digital means responsive to a desired final count in the counter for prohibiting the further transmission of pulses to the counter, and means for producing an electrical analog signal representative of the instantaneous count in the counter.

References Cited by the Examiner

UNITED STATES PATENTS

| 2,998,190 | 8/1961 | Rosenberg et al. | 235—151.11 |
| 3,002,115 | 9/1961 | Johnson et al. | |
| 3,099,781 | 7/1963 | Herchenroeder | 235—151.11 X |
| 3,148,316 | 9/1964 | Herchendroeder. | |
| 3,183,421 | 5/1965 | Herchenroeder | 235—151.11 X |

OTHER REFERENCES

Air Force Manual 101-8 Fundamentals of Electronics, July 1, 1957, page 26.

MALCOLM A. MORRISON, *Primary Examiner.*

K. W. DOBYNS, M. P. HARTMAN,
*Assistant Examiners.*